United States Patent
Lee et al.

(10) Patent No.: US 10,470,163 B2
(45) Date of Patent: Nov. 5, 2019

(54) METHOD AND APPARATUS FOR RECEIVING MBMS SERVICE

(71) Applicant: LG ELECTRONICS INC., Seoul (KR)

(72) Inventors: Youngdae Lee, Seoul (KR); Sangwook Han, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 15/673,994

(22) Filed: Aug. 10, 2017

(65) Prior Publication Data

US 2018/0049161 A1    Feb. 15, 2018

Related U.S. Application Data

(60) Provisional application No. 62/373,370, filed on Aug. 11, 2016.

(30) Foreign Application Priority Data

Jul. 27, 2017 (KR) ........................ 10-2017-0095309

(51) Int. Cl.
| | |
|---|---|
| *H04W 72/02* | (2009.01) |
| *H04W 72/00* | (2009.01) |
| *H04L 12/18* | (2006.01) |
| *H04W 88/02* | (2009.01) |
| *H04L 29/08* | (2006.01) |
| *H04W 4/70* | (2018.01) |
| *H04W 48/12* | (2009.01) |

(52) U.S. Cl.
CPC ............ *H04W 72/02* (2013.01); *H04L 12/189* (2013.01); *H04L 67/12* (2013.01); *H04W 4/70* (2018.02); *H04W 48/12* (2013.01); *H04W 72/005* (2013.01); *H04W 88/02* (2013.01)

(58) Field of Classification Search
CPC ....... H04W 72/02; H04W 48/12; H04W 4/70; H04W 72/005; H04W 88/02; H04W 4/06; H04W 68/00; H04W 72/042; H04W 36/0007; H04W 48/10; H04W 72/121; H04W 4/08; H04W 16/02; H04L 12/189; H04L 67/12; H04L 5/0053; H04L 65/4076
See application file for complete search history.

(56) References Cited

U.S. PATENT DOCUMENTS

| | | | | |
|---|---|---|---|---|
| 2014/0177437 A1* | 6/2014 | Korus | ................... | H04W 76/45 370/230 |
| 2015/0304091 A1* | 10/2015 | Gou | ...................... | H04L 5/0053 370/329 |

(Continued)

*Primary Examiner* — Awet Haile
(74) *Attorney, Agent, or Firm* — Birch, Stewart, Kolasch & Birch, LLP

(57) ABSTRACT

Provided are a method of receiving a multimedia broadcast multicast service (MBMS) service by a terminal in a wireless communication system, and an apparatus supporting the method. The method may include: receiving from a base station a broadcast identifier (ID) and the total number of physical resource blocks (PRBs) within a system bandwidth; selecting a specific PRB from one or more PRBs within the system bandwidth by using the received broadcast ID and total number of PRBs; and receiving the MBMS service on the selected specific PRB.

19 Claims, 15 Drawing Sheets

(56) References Cited

U.S. PATENT DOCUMENTS

2016/0007320 A1* 1/2016 Wang .................... H04W 28/02
370/235
2018/0020432 A1* 1/2018 Rico Alvarino ........ H04W 8/22
2018/0049224 A1* 2/2018 Dinan ............... H04W 72/1242

* cited by examiner (a)

(b)

METHOD AND APPARATUS FOR RECEIVING MBMS SERVICE

CROSS-REFERENCE TO RELATED APPLICATIONS

This application claims the benefit of U.S. Provisional Application No. 62/373,370 filed on Aug. 11, 2016, and Korean Patent Application No. 10-2017-0095309 filed on Jul. 27, 2017, the contents of which are all hereby incorporated by reference herein in their entirety.

BACKGROUND OF THE INVENTION

Field of the Invention

The present invention relates to a wireless communication system, and more particularly, to a method in which a terminal selects a specific physical resource block (PRB) within a system bandwidth and receives a multimedia broadcast multicast service (MBMS) service, and an apparatus supporting the method.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

Significant communication technologies, such as those for public safety and group communication system enablers for LTE (GCSE_LTE), have been introduced in Rel-12. In Rel-12 GCSE, eMBMS is designated for group communication. eMBMS is designed to provide media content in a pre-planned large area (that is, an MBSFN area). An MBSFN area is rather static (for example, is configured by O&M) and cannot be dynamically adjusted according to user distribution. Even though all radio resources in a frequency domain are not used, eMBMS transmission occupies the entire system bandwidth and does not allow unicast and multiplexing in the same subframe. An MBSFN subframe configuration is also rather static (for example, is set by O&M). That is, the MBSFN subframe cannot be dynamically adjusted according to the number of dynamic groups and the traffic load of a dynamic group. Thus, when providing important communication services, radio resources configured for eMBMS may be unnecessarily wasted. Therefore, single-cell point-to-multipoint (SCPTM) transmission has been proposed for efficient use of radio resources. MBSFN transmission transmits identifiable signals simultaneously in a plurality of cells, whereas SCPTM transmission transmits MBMS services in a single cell.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

Internet of things (IoT) is a future infrastructure and service of information communication in which all things are connected to the Internet to communicate directly with each other. Although the IoT is required to improve quality of life and to improve productivity on the basis of hyper-connected society, the IoT is ultimately important because it forms an infrastructure of the nation and further forms a central nerve system for the humanity and the Earth. The IoT is in an initial stage having no significant profit model up to now, but a future market scale of the IoT as a new paradigm of the $21^{St}$ century is more than 10 times the existing cellular mobile communication market, and is expected to grow rapidly. The IoT is roughly divided into a cellular mobile communication-based IoT (CIoT) and a non-cellular-based IoT.

SUMMARY OF THE INVENTION

Meanwhile, a terminal may be interested in receiving a multimedia broadcast multicast service (MBMS) service through single-cell point-to-multipoint (SCPTM) transmission in narrow band (NB) Internet of things (IoT) communication. In this case, the terminal which is interested in receiving the MBMS service in the NB IoT communication needs to know on which physical resource block (PRB) the MBMS service is provided. However, the terminal which is interested in receiving the MBMS service in the current NB IoT communication cannot know on which PRB the interesting MBMS service is provided. Therefore, there is a need to newly propose a method of receiving an MBMS service by an NB IoT terminal which is interested in receiving the MBMS service and an apparatus for supporting the method in NB IoT communication in which a bandwidth narrower than a system bandwidth is defined.

According to one embodiment, there is provided a method in which a terminal receives a multimedia broadcast multicast service (MBMS) service in a wireless communication system. The method may include: receiving from a base station a broadcast identifier (ID) and the total number of physical resource blocks (PRBs) within a system bandwidth; selecting a specific PRB from one or more PRBs within the system bandwidth by using the received broadcast ID and total number of PRBs; and receiving the MBMS service on the selected specific PRB.

The broadcast ID may be a temporary mobile group identity (TMGI). A PRB corresponding to a remainder value obtained by dividing the TMGI by the total number of PRBs may be selected as the specific PRB from one or more PRBs within the system bandwidth.

The broadcast ID may be a group radio network temporary identifier (G-RNTI). A PRB corresponding to a remainder value obtained by dividing the G-RNTI by the total number of PRBs may be selected as the specific PRB from one or more PRBs within the system bandwidth.

The method may further include: monitoring a narrow band physical downlink control channel (NPDCH) by using a single cell radio network temporary identifier (SC-RNTI) on the selected specific PRB; and receiving a single cell multicast control channel (SC-MCCH) through the monitoring of the NPDCCH. The SC-MCCH may include a TMGI and G-RNTI mapping information with respect to the TMGI. The SC-MCCH may be received on the selected specific PRB. The SC-MCCH may be received on a PRB different from the selected specific PRB.

The method may further include monitoring an NPDCCH by using a G-RNTI to be mapped to a TMGI on the selected specific PRB. The MBMS service may be received through a single cell multicast traffic channel (SC-MTCH) identified through the monitoring of the NPDCCH. The method may further include, if the SC-MTCH identified through the monitoring of the NPDCCH is transmitted on a PRB different from the selected specific PRB, receiving the MBMS service on the PRB different from the selected specific PRB.

The method may further include: monitoring the NPDCCH by using a single cell notification radio network temporary identifier (SC-N-RNTI) on the selected specific PRB; and receiving an SC-MCCH change notification identified through the monitoring of the NPDCCH.

The MBMS service may be received through a single cell multimedia radio bearer (SC-MRB).

The terminal may be an NB-IoT terminal.

The broadcast ID and the total number of PRBs within the system bandwidth may be received by using system information.

According to another embodiment, there is provided a terminal of receiving an MBMS service in a wireless communication system. The terminal may include: a memory; a transceiver; and a processor operatively coupling the memory and the transceiver. The processor may be configured for: controlling the transceiver to receive from a base station a broadcast ID and the total number of PRBs within a system bandwidth; selecting a specific PRB from one or more PRBs within the system bandwidth by using the received broadcast ID and total number of PRBs; and controlling the transceiver to receive the MBMS service on the selected specific PRB.

When one or more physical resource blocks (PRBs) are configured within a system bandwidth, a terminal can receive a multimedia broadcast multicast service (MBMS) service through a specific PRB.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
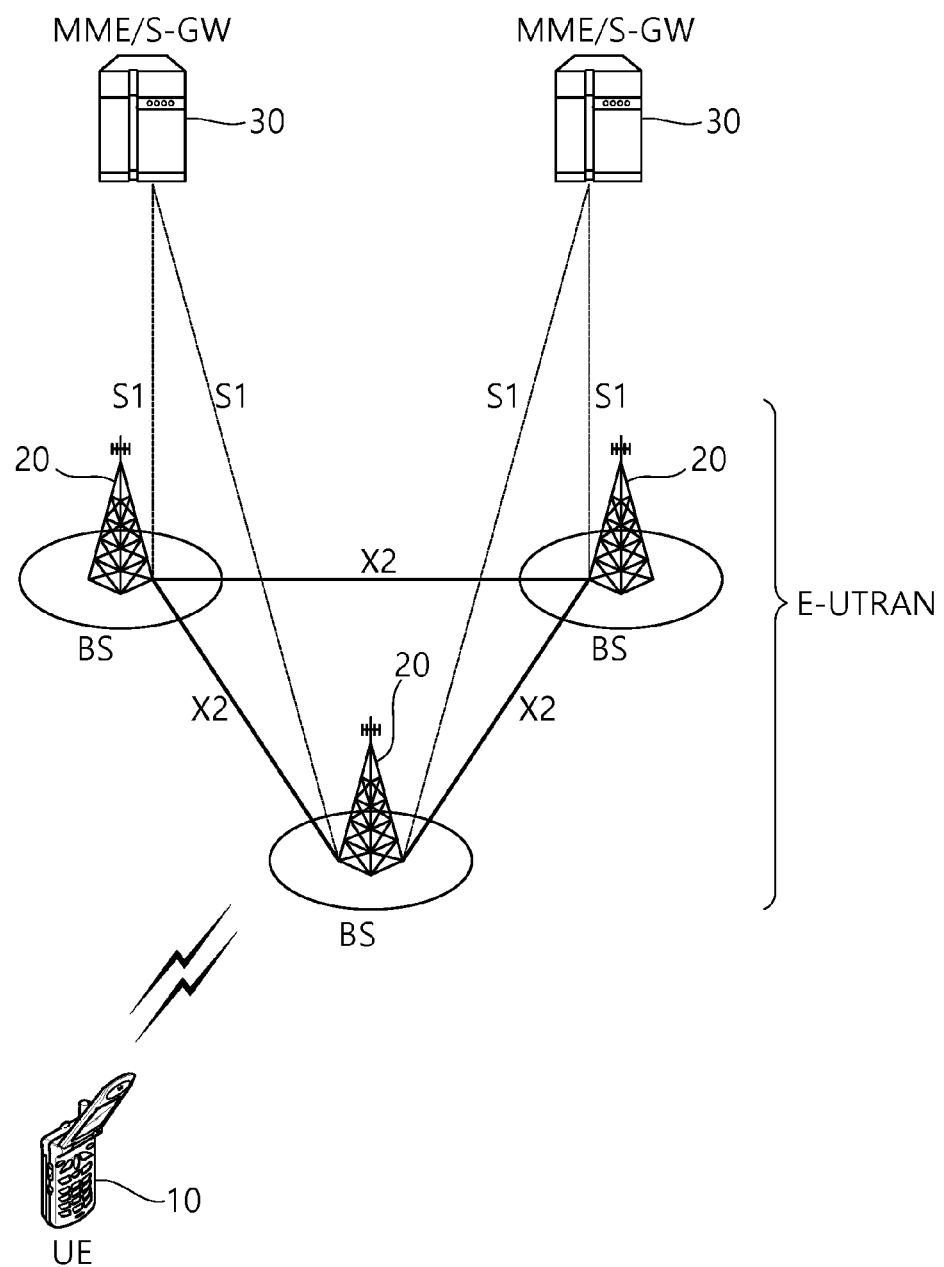
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
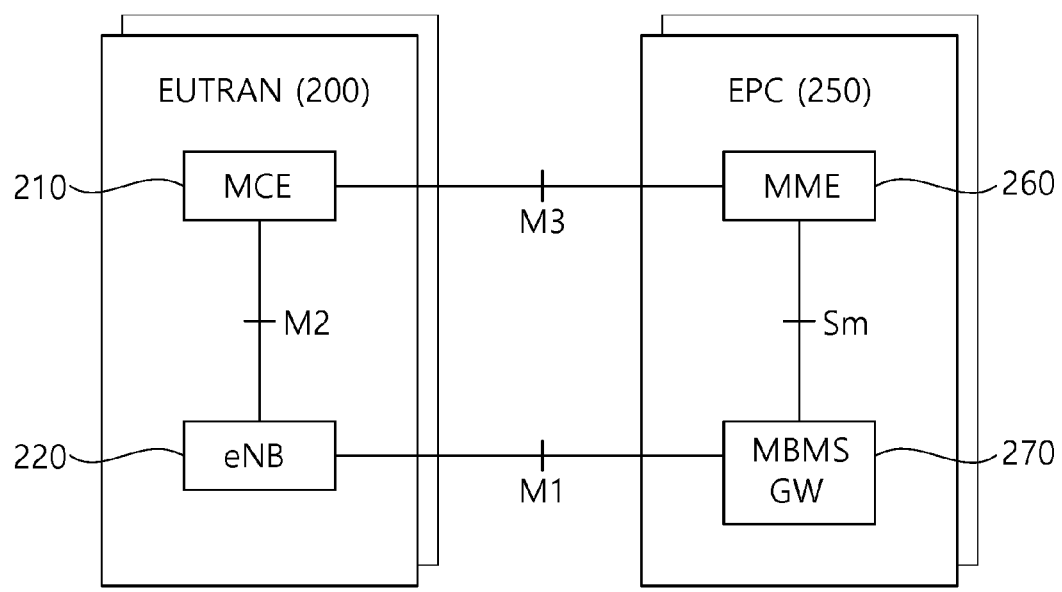
FIG. 2 shows a network architecture of an MBMS.

FIG. 2 shows a network architecture of an MBMS.

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The EPC (Evolved Packet Core, 250) includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

Figure 3:
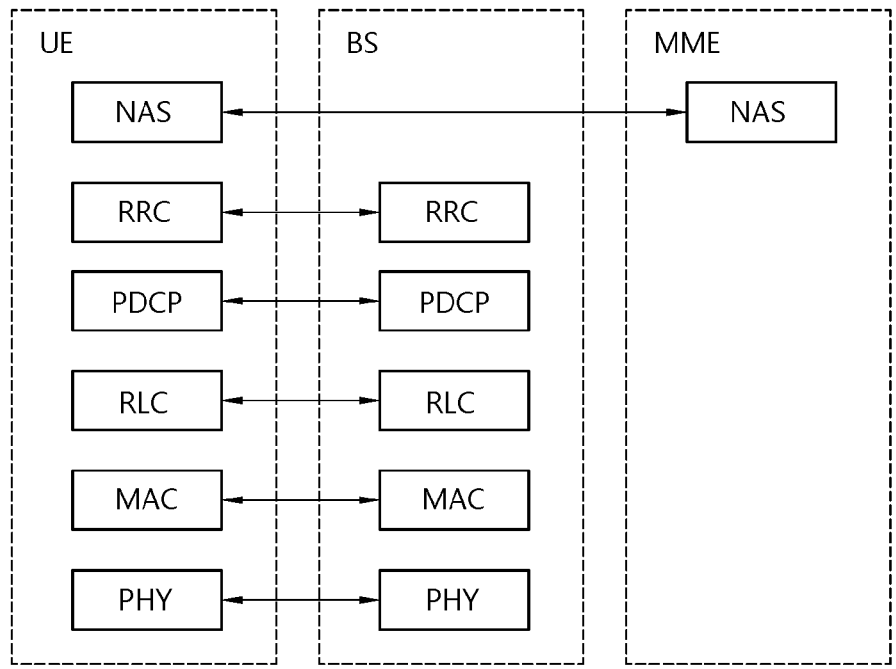
FIG. 3 shows a control plane and a user plane of a radio interface protocol of an LTE system.
Figure 3:
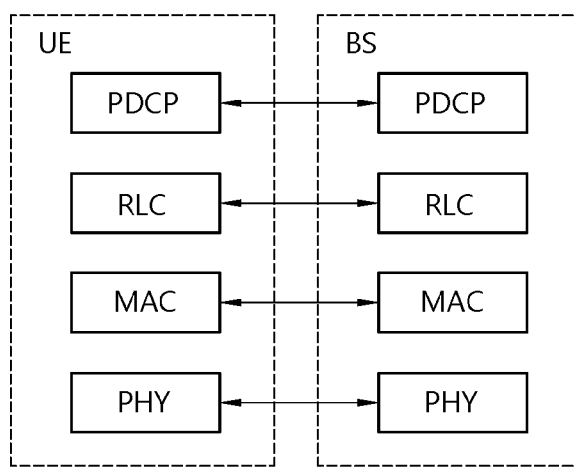

FIG. 3 shows a control plane and a user plane of a radio interface protocol of an LTE system. FIG. 3A shows a control plane of a radio interface protocol of an LTE system. FIG. 3B shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3A, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3B, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an MBMS and a Multicast/Broadcast Signal Frequency Network (MBSFN) Will be Described.

MBSFN transmission or MBSFN-mode transmission implies a simultaneous transmission scheme implemented by transmitting the same signal at the same time in a plurality of cells. MBSFN transmission from the plurality of cells in an MBSFN area is regarded by a UE as single transmission.

An MBMS service may be subjected to cell-based or geography-based management or localization. An MBMS service area is a term referring to an area in which a specific MBMS service is provided. For example, if an area in which a specific service A is performed is referred to as the MBMS service area A, a network may be in a state of transmitting the MBMS service A in the MBMS service area A. In this case, the UE may receive the MBMS service A according to capability of the UE. The MBMS service area may be defined in terms of an application and service regarding whether a specific service is provided in a specific area or not.

A multicast control channel (MCCH) or a multicast traffic channel (MTCH) may be mapped to a multicast channel (MCH) which is a transmission channel for the MBMS. The MCCH transmits an MBMS-related RRC message, and the MTCH transmits traffic of a specific MBMS service. One MCCH exists for one MBMS single frequency network (MBSFN) for transmitting the same MBMS information/traffic, and if a plurality of MBSFN areas are provided in one cell, the UE may receive a plurality of MCCHs. The MCCH has a list of all MBMS services by including one MBSFN area configuration RRC message. If the MBMS-related RRC message is modified in a specific MCCH, a physical downlink control channel (PDCCH) transmits an MBMS radio network temporary identity (M-RNTI) and an indication indicating the specific MCCH. A UE supporting the MBMS may receive the M-RNTI and the MCCH indication through the PDDCH to recognize that the MBMS-related RRC message has been modified in the specific MCCH, and may receive the specific MCCH. The RRC message of the MCCH may be modified in every modification period, and is repetitively broadcast in every modification period. A notification mechanism is used to notify an MCCH modification caused by the start of an MCCH session or the existence of an MBMS counting request message. The UE detects the MCCH modification which is notified without depending on the notification mechanism through MCCH monitoring at the modification period. The MTCH is a logical channel on which the MBMS service is carried, and a plurality of MTCHs may be configured if there are many services provided in the MBSFN area.

The UE may receive a dedicated service during the MBMS service is received. For example, while a certain user watches TV through an MBMS service by using a smart-phone of the user, the user can perform chatting through an instant message (IM) service such as MSN or Skype by using the smart-phone. In this case, the MBMS service is provided through an MTCH received together by several UEs, and a service individually provided to each UE similarly to the IM service is provided through a dedicated bearer such as DCCH or DTCH.

In one area, a certain eNB may use several frequencies at the same time. In this case, in order to effectively use a radio resource, a network may select one of the several frequencies to provide an MBMS service at that frequency, and may provide a dedicated bearer to each UE at all frequencies. In this case, if a UE which receives a service by using a dedicated bearer at a frequency at which the MBMS service is not provided desires to receive the MSMB service, the UE needs to be handed over to a frequency at which the MBMS is provided. For this, the UE transmits an MBMS interest indication to the eNB. That is, the UE transmits the MBMS interest indication to the eNB when desiring to receive the MBMS service, and the eNB recognizes that the UE desires to receive the MBMS service upon receiving the indication, and thus moves the UE to the frequency at which the MBMS is provided. Herein, the MBMS interest indication implies information indicating that the UE desires to receive the MBMS service, and additionally includes information regarding to which frequency it desires to move.

A UE which desires to receive a specific MBMS service recognizes frequency information and broadcast time information for providing the specific service. If the MBMS service has already been broadcasting or is going to be broadcast soon, the UE sets a top priority to the frequency at which the MBMS service is provided. The UE performs a cell reselection procedure by using re-configured frequency priority information, and thus receives the MBMS service by moving to the cell for providing the MBMS service.

If the UE is receiving the MBMS service or is interested in receiving it or is capable of receiving the MBS service while camping on the frequency at which the MBMS service is provided, in a situation where a reselected cell is broadcasting system information block 13 (SIB13), it may be considered that a top priority is applied to a corresponding frequency during the MBMS service as long as the following situation is continued.

When SIB15 of a serving cell indicates that one or more MBMS service area identities (SAIs) are included in user service description (USD) of a corresponding service.

When the SIB15 is not broadcast in the serving cell, and the corresponding frequency is included in the USD of the corresponding service.

The UE needs to be capable of performing MBMS reception in RRC_IDLE and RRC_CONNECTED states.

Figure 4:
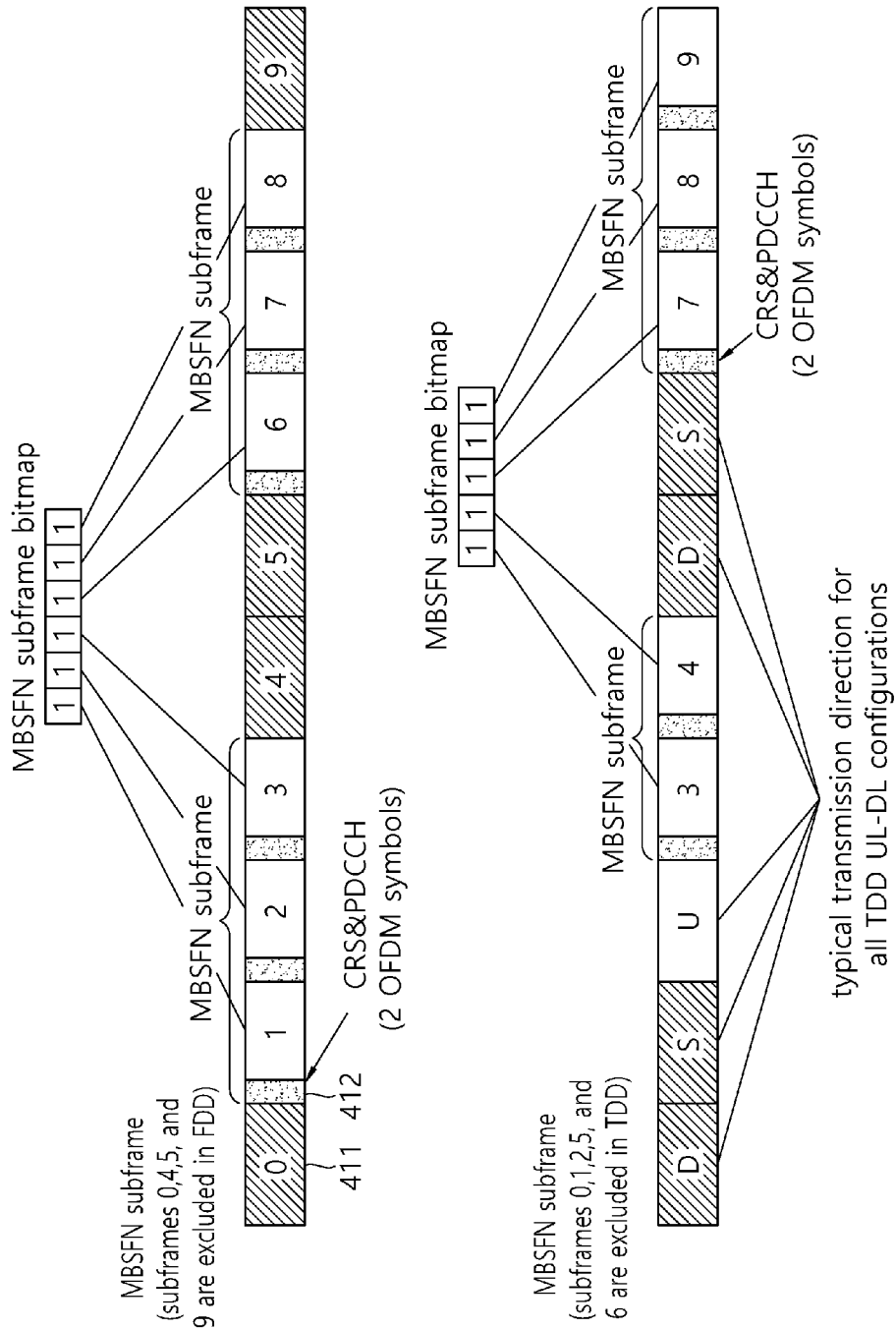
FIG. 4 shows a structure of an MBSFN subframe.

FIG. 4 shows a structure of an MBSFN subframe.

Referring to FIG. 4, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe. Since most UEs perform radio resource management (RRM), radio link failure (RLF) processing, and synchronization using a CRS, it is important to indicate the absence of a CRS in a specific region. A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 411 uses a normal CP, a CRS according to the normal CP is also used in the first two OFDM symbols 412 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Hereinafter, Single-Cell Point-to-Multipoint (SCPTM) Transmission is Described.

A transmission method of an MBMS service includes SCPTM transmission and multimedia broadcast multicast service single frequency network (MBSFN) transmission. While identifiable signals are transmitted simultaneously in a plurality of cells in the MBSFN transmission, the MBMS service is transmitted in a single cell in the SCPTM transmission. Therefore, unlike in the MBSFN transmission, synchronization between cells is not necessary in the SCPTM transmission. Further, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is determined that a service desired by the UE is an SCPTM service through the MCCH, the UE may acquire a corresponding RNTI value and read a PDCCH through a corresponding RNTI to receive the SCPTM service.

Hereinafter, Internet of Things (IoT) is Described.

Figure 5:
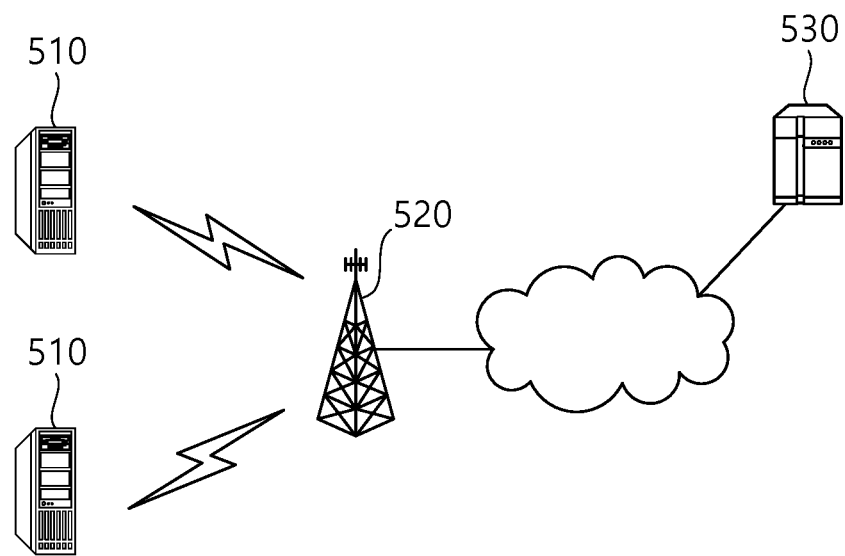
FIG. 5 shows an example of Internet of things (IoT) communication.

FIG. 5 shows an example of IoT communication.

IoT refers to information exchange between IoT UEs 510 without human interaction via a BS 520 or information exchange between the IoT UE 510 and an MTC server 530 via the BS. A service provided using the IoT is differentiated from the existing communication service with human intervention, and there are various categories of services such as tracking, metering, payment, medical field services, remote controlling, or the like. More specifically, the service provided using the IoT may include reading a meter, measuring a water level, utilizing a camera, inventory reporting of a vending machine, or the like. For convenience, a low cost/low specification UE which primarily aims at data communication for providing such a service may be called an IoT UE, an MTC UE, or a low complexity type UE.

The IoT server 530 is an entity for communicating with the IoT UE 510. The IoT server 530 executes an IoT application, and provides an IoT-specific service to the IoT UE. The IoT UE 510 is a wireless device for providing IoT communication, and may be fixed or mobile.

In case of the IoT UE, a transmission data amount is low, and uplink/downlink data is transmitted and received not frequently. Therefore, it is effective to decrease a unit cost of the UE and to decrease a battery consumption according to a low data transmission rate. The IoT UE has a small mobility, and thus has a characteristic in that a channel environment is almost not changed.

Figure 6:
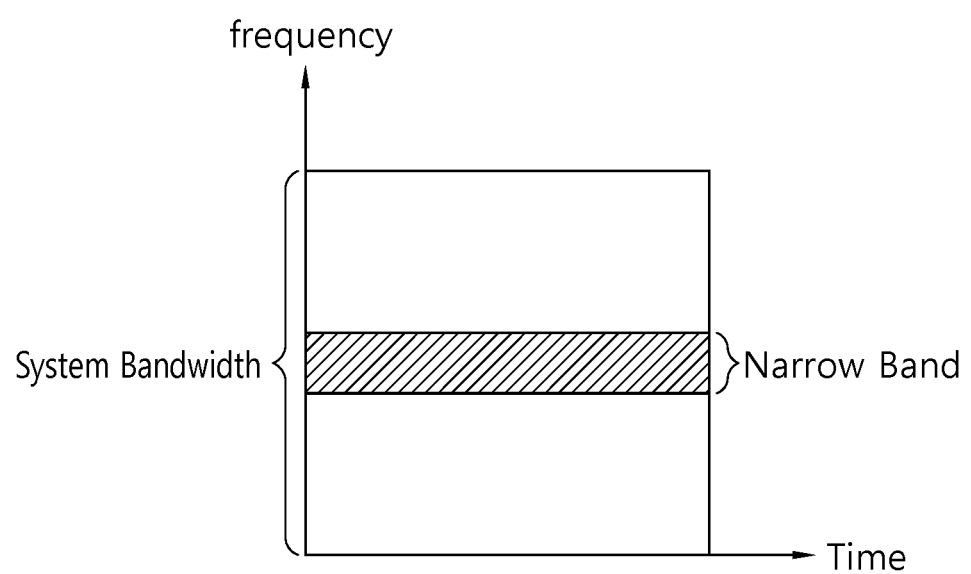
FIG. 6 and FIG. 7 show an example of a narrow band at which an IoT device operates.
Figure 7:
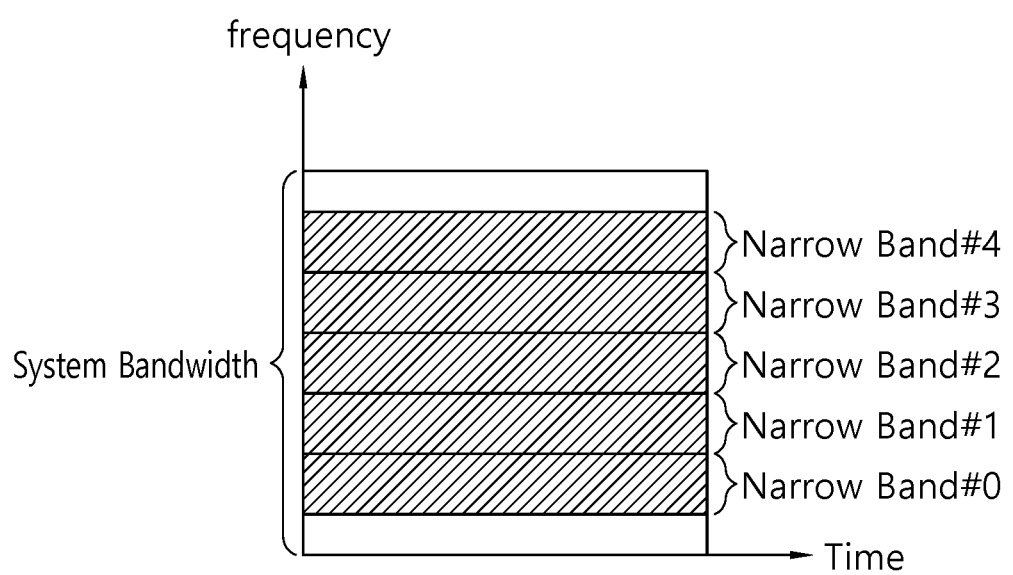

FIG. 6 and FIG. 7 show an example of a narrow band at which an IoT device operates.

As one way of implementing an IoT UE with low cost, the IoT UE may use a narrow band irrespective of a system bandwidth of a cell. For example, the narrow band may have a bandwidth of about 1.4 MHz. In this case, as shown in FIG. 6, a narrow band region in which the IoT UE operates may be located in a central region (e.g., six PRBs in the middle) of the system bandwidth of the cell. Alternatively, as shown in FIG. 7, a plurality of narrow band regions in which the IoT UE operates may be present in one subframe to perform multiplexing in a subframe between the IoT UEs, and different IoT UEs may use different narrow bands. In this case, most of IoT UEs may use a different narrow band other than a central region (e.g., six PRBs in the middle) of the system band of the cell. Therefore, IoT communication operating on a reduced bandwidth may be referred to as narrow band (NB) IoT communication or NB CIoT communication.

Meanwhile, the UE may be interested in receiving of the MBMS service through SCPTM transmission in the NB IoT communication. For example, the UE may be an NB IoT UE. In this case, the UE which is interested in receiving the NBNS service in the NB IoT communication needs to know on which a physical resource block (PRB) the MBMS service is provided. However, the UE which is interested in receiving the MBMS service in the current NB IoT communication cannot know on which PRB the interesting MEMS service is provided. Therefore, in the NB IoT communication in which a bandwidth narrower than the system bandwidth is defined, the NB IoT UE which is interested in receiving the MBMS service may not be able to receive the MBMS service. Hereinafter, a procedure in which the UE receives the MBMS service by selecting the PRB on which the MBMS service is provided is described according to an embodiment of the present invention. In the present specification, the narrow band may have the same concept as the PRB.

Figure 8:
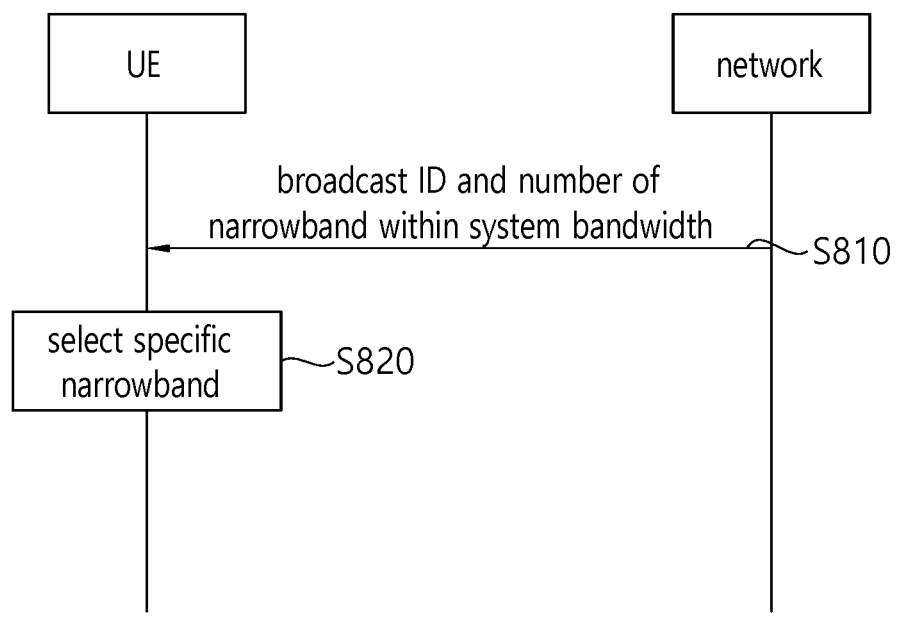
FIG. 8 shows a procedure in which a user equipment (UE) selects a specific narrow band from a plurality of narrow bands within a system bandwidth according to an embodiment of the present invention.

FIG. 8 shows a procedure in which a UE selects a specific narrow band from a plurality of narrow bands within a system bandwidth according to an embodiment of the present invention.

Referring to FIG. 8, in step S810, a UE may receive a broadcast identifier (ID) and the total number of narrow bands within a system band from a network. The broadcast ID may be a G-RNTI or a temporary mobile group identity (TMGI). The G-RNTI may be an RNTI for identifying transmission of an SC-MTCH.

In step S820, the UE may select a specific bandwidth at which an MBMS service is provided on the basis of the received broadcast ID and number of narrow bands. The specific narrow band may be calculated by Equation 1.

$$SC\_NB = (\text{Broadcast ID}) \bmod N\_Nb \quad \text{[Equation 1]}$$

The broadcast ID may be any one of the G-RNTI and the TMGI. The N_Nb may be the total number of narrow bands within the system band. The SC_NB may be a specific narrow band at which the MBMS service is provided through SCPTM transmission.

Thereafter, the UE may receive an MBMS service on a selected specific narrow band.

Hereinafter, a procedure of selecting a specific narrow band at which an MBMS service is provided is described in greater detail with reference to FIG. 9.

Figure 9:
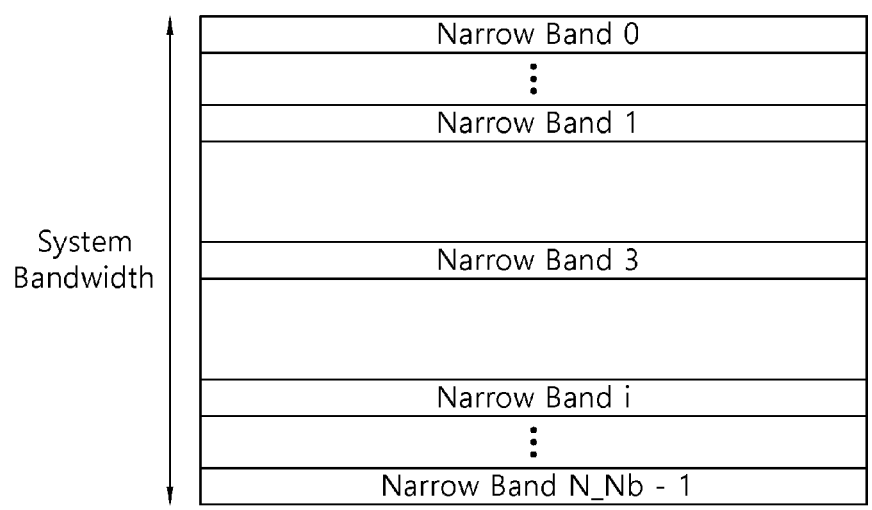
FIG. 9 shows an example of configuring a plurality of narrow bands within a system band according to an embodiment of the present invention.

FIG. 9 shows an example of configuring a plurality of narrow bands within a system band according to an embodiment of the present invention.

Referring to FIG. 9, N_Nb narrow bands are present within a system bandwidth. That is, a narrow band 0 to a narrow band N_Nb−1 are present within the system bandwidth. A UE may receive a broadcast ID and N_Nb from a network, and may select a specific narrow band at which an MBMS service is provided through SCPTM transmission based on the received broadcast ID and N_Nb.

For example, if a remainder value obtained by dividing a TMGI by the N_Nb is 3, the UE may select a narrow band 3. For example, if a remainder value obtained by dividing the TMGI by the N_Nb is 0, the UE may select the narrow band 0. In addition, the UE may receive the MBMS service through SCPTM transmission on the selected narrow band.

According to the embodiment of the present invention, in NB IoT communication in which a bandwidth narrower than a system bandwidth is defined, an NB IoT UE which is interested in receiving the MBMS service may select a specific narrow band, and may receive the MBMS service on the selected specific narrow band.

Figure 10:
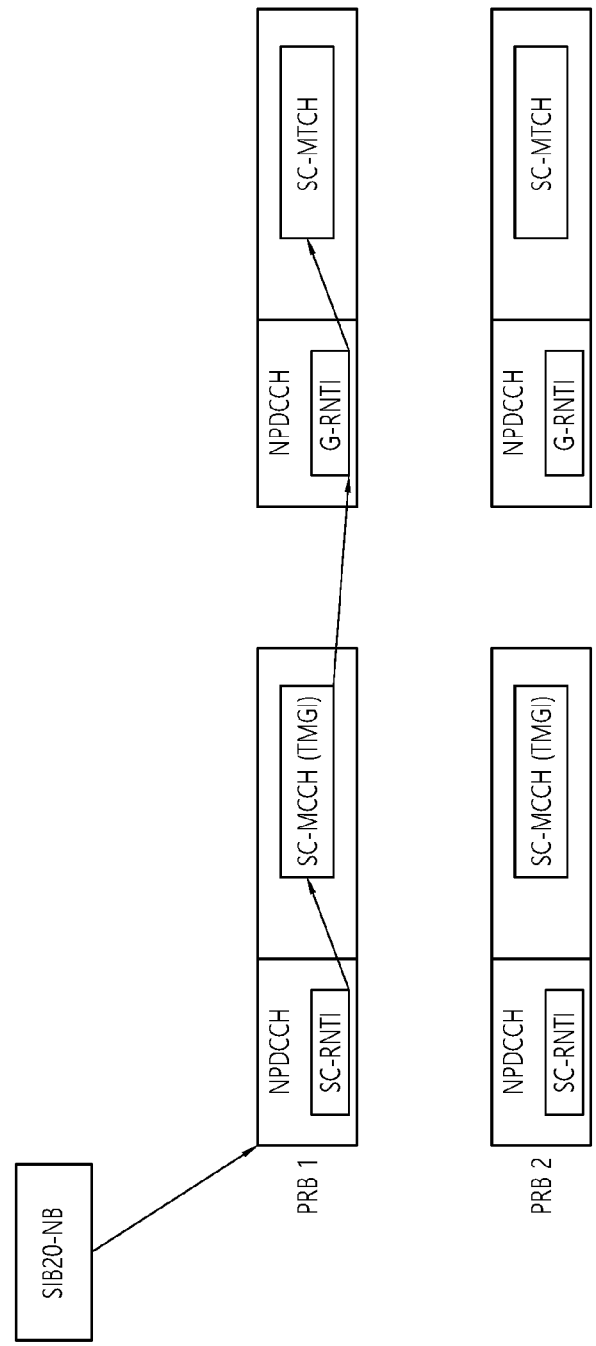
FIG. 10 to FIG. 12 show an example in which a UE selects one or more narrow bands from a plurality of narrow bands within a system bandwidth according to an embodiment of the present invention.
Figure 11:
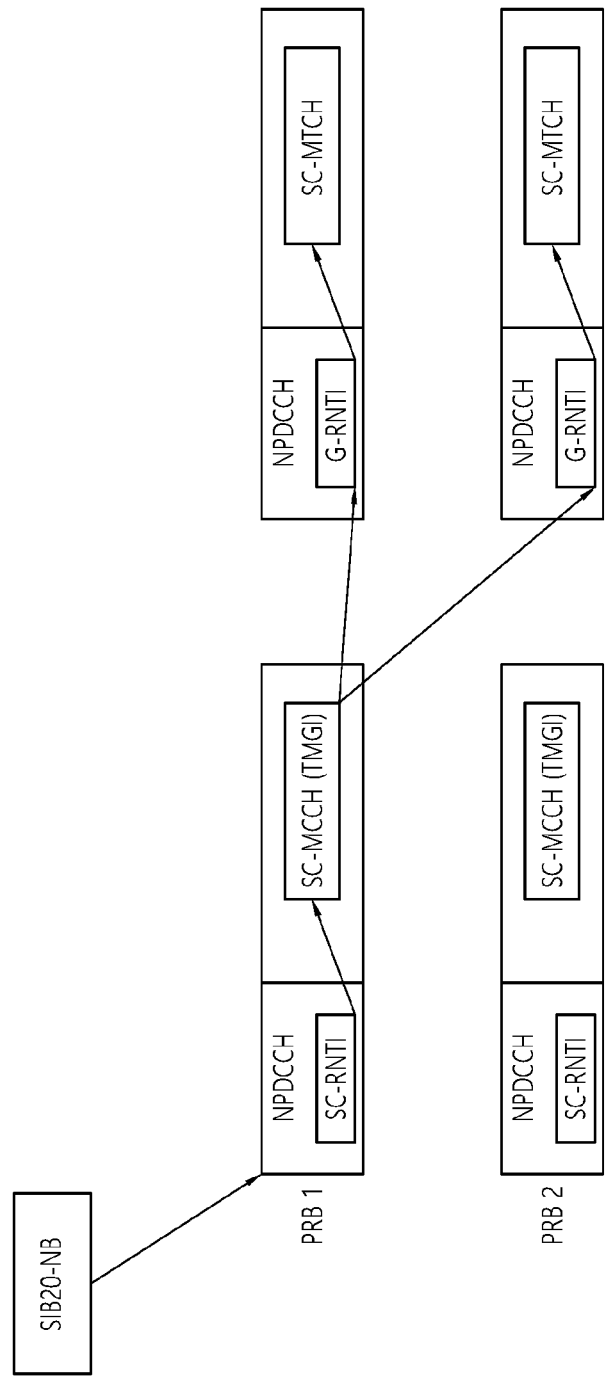
Figure 12:
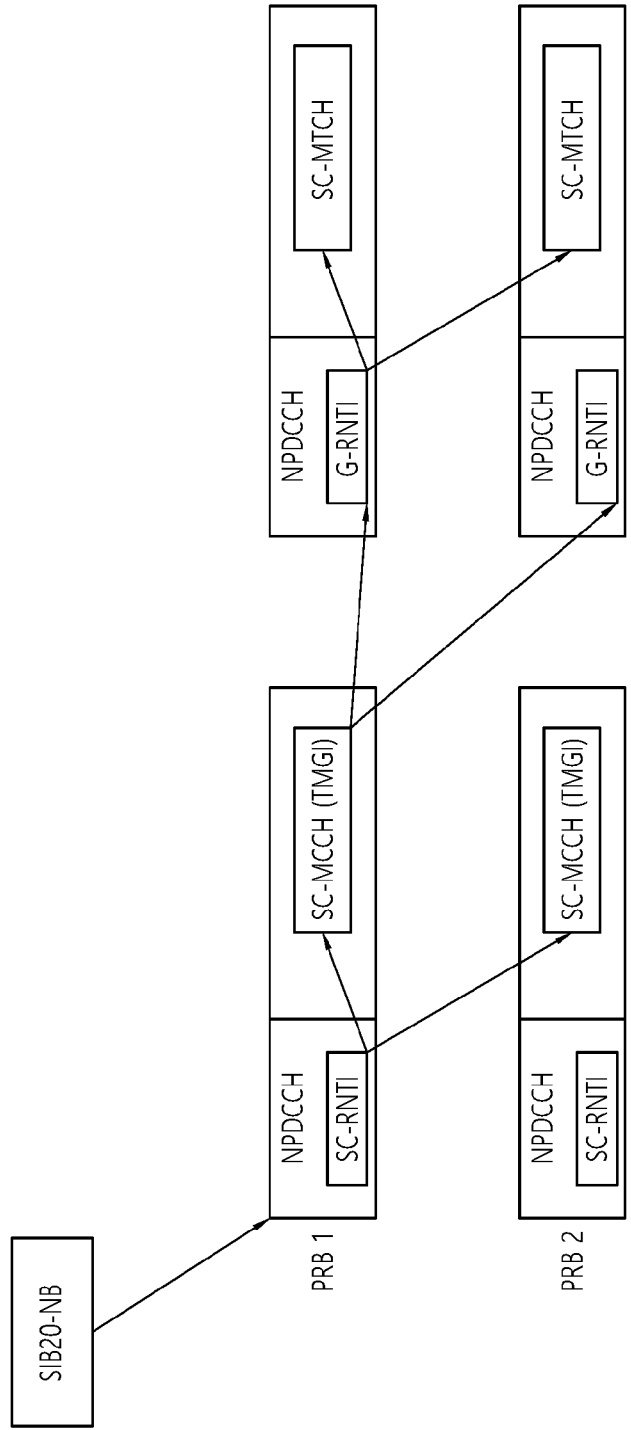

FIG. 10 to FIG. 12 show an example in which a UE selects one or more narrow bands from a plurality of narrow bands within a system bandwidth according to an embodiment of the present invention.

Referring to FIG. 10, an NB IoT UE may monitor the same PRB with respect to an SC-MTCH and an SC-MCCH. The PRB to be monitored may be indicated by an SIB. The SIB may be an SIB20-NB.

Referring to FIG. 11, an NB IoT UE may monitor different PRBs with respect to an SC-MTCH and an SC-MCCH. If a TMGI of the SC-MCCH is capable of indicating a PRB different from an anchor PRB, the UE may monitor the different PRB with respect to the SC-MTCH by using a G-RNTI to be mapped to the TMGI. For example, the UE may monitor an NPDCCH of a PRB 1 with respect to the SC-MCCH by using an SC-RNTI, decode the SC-MCCH, and thereafter monitor an NPDCCH of a PRB 2 with respect to the SC-MTCH by using the G-RNTI. The PRB 2 may be a PRB calculated by Equation 1.

Referring to FIG. 12, an NB IoT UE may monitor different PRBs with respect to an SC-MTCH and an SC-MCCH. An NPDCCH may indicate an SC-MTCH and SC-MCCH different from those of an anchor PRB. A G-RNTI and SC-RNTI of a PDCCH may indicate different PRBs. This is the most flexible structure. The PRB 2 may be a PRB calculated by Equation 1.

Figure 13:
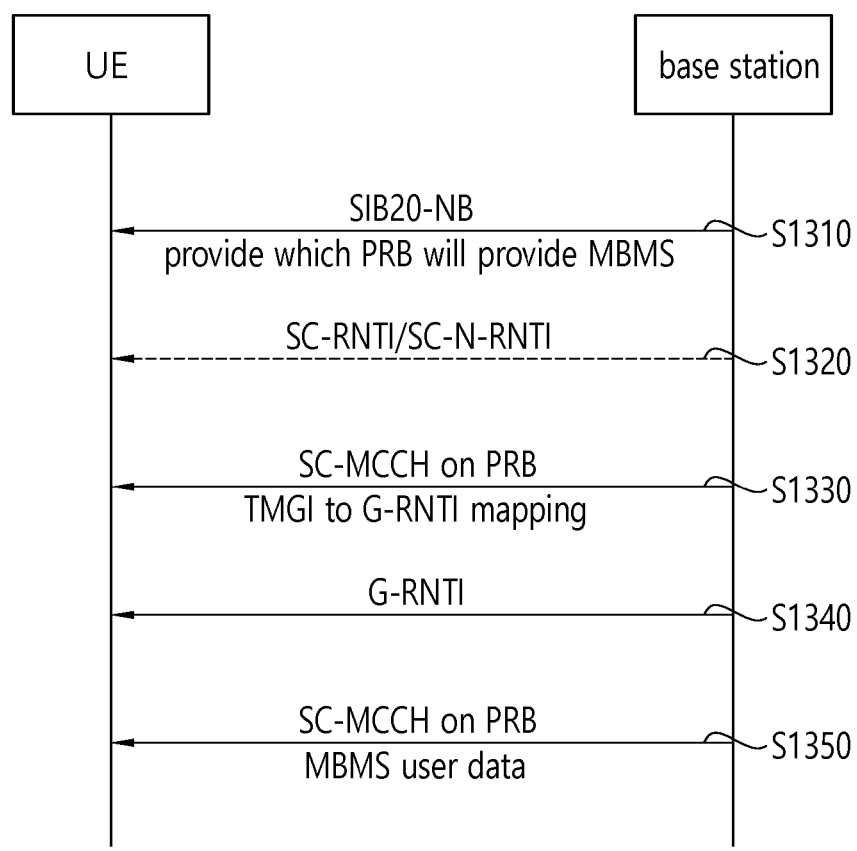
FIG. 13 shows a procedure in which a UE receives multimedia broadcast multicast service (MBMS) user data according to an embodiment of the present invention.

FIG. 13 shows a procedure in which a UE receives MBMS user data according to an embodiment of the present invention.

Referring to FIG. 13, in step S1310, a UE may receive a system information block for indicating which PRB provides an MBMS service from a BS. An NB IoT UE which is interested in receiving the MBMS service through SC-MRB may apply a procedure of obtaining SC-MCCH information when entering a cell. The cell may broadcast the system information block, and the system information block may include information indicating which PRB provides the MBMS service. The system information block may be SystemInformationBlockType20-NB (SIB20-NB).

The system information block may include information indicating which PRB provides the MBMS service through SCPTM transmission. The BS may broadcast the system information block including PRB information indicating which PRB will be selected to receive the MBMS service. The PRB information may include information regarding which PRB provides the MBMS service and which PRB will be monitored by the UE. After the UE decodes the system information block, the UE may confirm which PRB provides the MBMS service.

In step S1320, to identify transmission of the SC-MCCH, the UE may monitor an NPDCCH of a specific PRB by using an SC-RNTI. The specific PRB may be a PRB on which the MBMS service is broadcast among a plurality of PRBs within a system band. The specific PRB may be indicated by the SIB20-NB.

Additionally, in step S1320, to identify an SC-MCCH change notification, the UE may monitor the NPDCCH of the specific PRB by using an SC-N-RNTI. The specific PRB may be indicated by the SIB20-NB.

Change of SC-MCCH information only occurs at specific radio frames, i.e. the concept of a modification period is used. Within a modification period, the same SC-MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockType20.

When the network changes the SC-MCCH information, it notifies the UEs about the change in the first subframe which can be used for SC-MCCH transmission in a repetition period. LSB bit in 8-bit bitmap when set to '1' indicates the change in SC-MCCH. Upon receiving a change notification, a UE interested to receive MBMS services transmitted using SC-PTM acquires the new SC-MCCH information starting from the same subframe. The UE applies the previously acquired SC-MCCH information until the UE acquires the new SC-MCCH information.

If the procedure is triggered by an SC-MCCH information change notification, the UE starts acquiring the SCPTM-Configuration message from the subframe where the change notification was received. If the UE enters a cell broadcasting SystemInformationBlockType20, the UE acquires the SCPTMConfiguration message at the next repetition period. If the UE is receiving an MBMS service via an SC-MRB, the UE starts acquiring the SCPTMConfiguration message from the beginning of each modification period.

In step S1330, the BS may transmit G-RNTI mapping information with respect to the TMGI to the UE through the SC-MCCH including the PRB information regarding the SC-MTCH.

In step S1340, after the UE decodes the SC-MCCH, the UE may confirm which PRB provides the SC-MTCH. To identify transmission of the SC-MTCH, the UE may monitor the NPDCCH of the specific PRB by using the G-RNTI. The specific PRB may be indicated by the SC-MCCH. The G-RNTI may be mapped to the TMGI. The G-RNTI per TMGI may be allocated to a user group to schedule PDSCH transmission.

In step S1350, the UE may receive MBMS user data through the SC-MTCH on a specific PRB.

Figure 14:
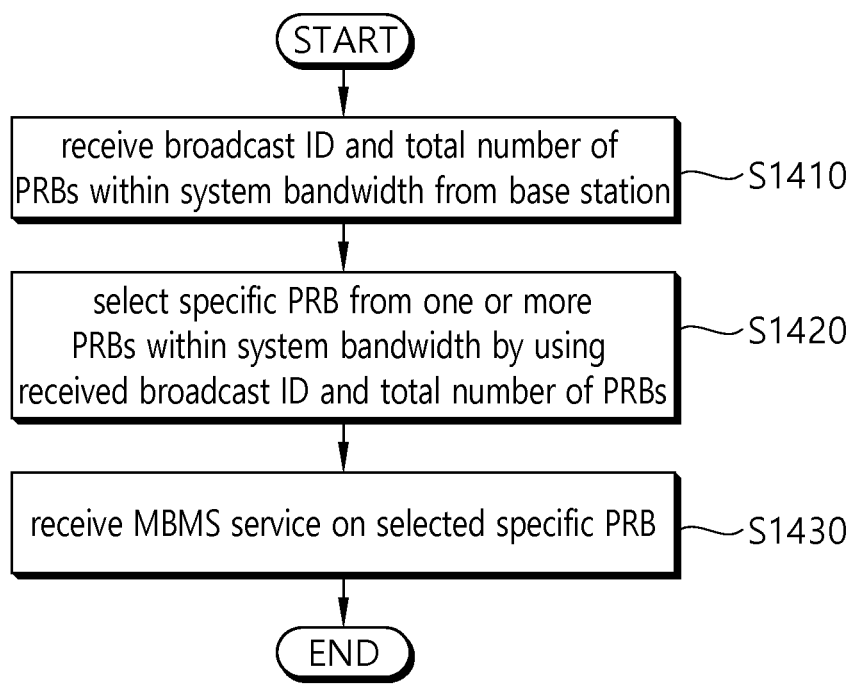
FIG. 14 is a block diagram illustrating a method in which a UE receives an MBMS service according to an embodiment of the present invention.

FIG. 14 is a block diagram illustrating a method in which a UE receives an MBMS service according to an embodiment of the present invention.

Referring to FIG. 14, in step S1410, a UE may receive a broadcast ID and the total number of physical resource blocks (PRBs) within a system bandwidth from a BS. The broadcast ID and the total number of PRBs within the system bandwidth may be received by using system information.

In step S1420, the UE may select a specific PRB from one or more PRBs within the system bandwidth by using the received broadcast ID and total number of PRBs.

The broadcast ID may be a temporary mobile group identity (TMGI). In this case, a PRB corresponding to a remainder value obtained by dividing the TMGI by the total number of PRBs may be selected as the specific PRB from one or more PRBs within the system bandwidth.

The broadcast ID may be a group radio network temporary identifier (G-RNTI). In this case, a PRB corresponding to a remainder value obtained by dividing the G-RNTI by the total number of PRBs may be selected as the specific PRB from one or more PRBs within the system bandwidth.

In step S1430, the UE may receive the MBMS service on the selected specific PRB. The MBMS service may be received through a single cell multimedia radio bearer (SC-MRB). The UE may be an NB-IoT UE.

Additionally, the UE may monitor a narrow band physical downlink control channel (NPDCH) by using a single cell radio network temporary identifier (SC-RNTI) on the selected specific PRB, and may receive a single cell multicast control channel (SC-MCCH) through the monitoring of the NPDCCH. The SC-MCCH may include a TMGI and G-RNTI mapping information with respect to the TMGI. The SC-MCCH may be received on the selected specific PRB. The SC-MCCH may be received on a PRB different from the selected specific PRB.

Additionally, the UE may monitor the NPDCCH by using a G-RNTI to be mapped to a TMGI on the selected specific PRB. The MBMS service may be received through a single cell multicast traffic channel (SC-MTCH) identified through the monitoring of the NPDCCH. If the SC-MTCH identified through the monitoring of the NPDCCH is transmitted on a PRB different from the selected specific PRB, the UE may receive the MBMS service on the PRB different from the selected specific PRB.

Additionally, the UE may monitor the NPDCCH by using a single cell notification radio network temporary identifier (SC-N-RNTI) on the selected specific PRB, and may receive an SC-MCCH change notification identified through the monitoring of the NPDCCH.

Figure 15:
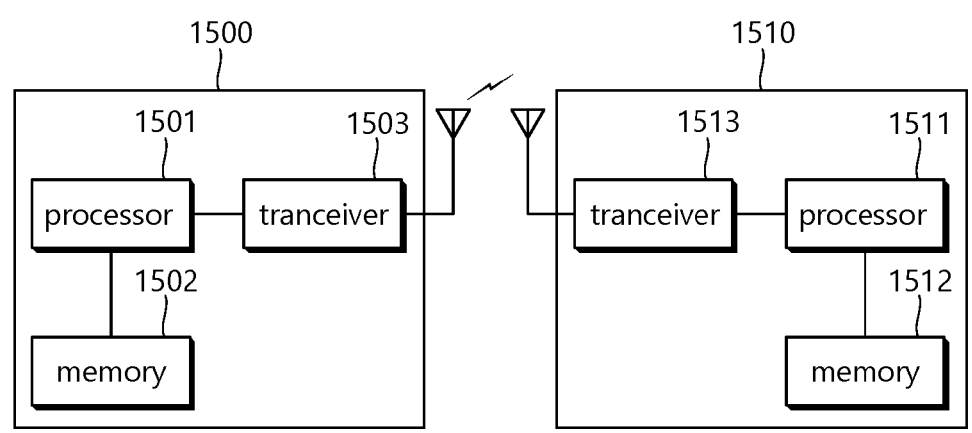
FIG. 15 is a block diagram illustrating a wireless communication system according to the embodiment of the present invention.

FIG. 15 is a block diagram illustrating a wireless communication system according to the embodiment of the present invention.

A BS 1500 includes a processor 1501, a memory 1502 and a transceiver 1503. The memory 1502 is connected to the processor 1501, and stores various information for driving the processor 1501. The transceiver 1503 is connected to the processor 1501, and transmits and/or receives radio signals. The processor 1501 implements proposed functions, processes and/or methods. In the above embodiment, an operation of the base station may be implemented by the processor 1501.

A UE 1510 includes a processor 1511, a memory 1512 and a transceiver 1513. The memory 1512 is connected to the processor 1511, and stores various information for driving the processor 1511. The transceiver 1513 is connected to the processor 1511, and transmits and/or receives radio signals. The processor 1511 implements proposed functions, processes and/or methods. In the above embodiment, an operation of the UE may be implemented by the processor 1511.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of receiving, by a terminal, a multimedia broadcast multicast service (MBMS) service in a wireless communication system, the method comprising:
   receiving from a base station a broadcast identifier (ID) and a total number of physical resource blocks (PRBs) within a system bandwidth;
   selecting a first PRB for the MBMS service within the system bandwidth based on the received broadcast ID and the total number of PRBs; and
   receiving the MBMS service on the selected first PRB.

2. The method of claim 1, wherein the broadcast ID is a temporary mobile group identity (TMGI).

3. The method of claim 2, wherein a PRB corresponding to a remainder value obtained by dividing the TMGI by the total number of PRBs is selected as the first PRB within the system bandwidth.

4. The method of claim 1, wherein the broadcast ID is a group radio network temporary identifier (G-RNTI).

5. The method of claim 4, wherein a PRB corresponding to a remainder value obtained by dividing the G-RNTI by the total number of PRBs is selected as the first PRB within the system bandwidth.

6. The method of claim 1, further comprising:
   monitoring a narrow band physical downlink control channel (NPDCH) by using a single cell radio network temporary identifier (SC-RNTI) on the selected specific first PRB; and
   receiving a single cell multicast control channel (SC-MCCH) through the monitoring of the NPDCCH,
   wherein the SC-MCCH comprises a temporary mobile group identity (TMGI) and group radio network temporary identifier (G-RNTI) mapping information with respect to the TMGI.

7. The method of claim 6, wherein the SC-MCCH is received on the selected first PRB.

8. The method of claim 6, wherein the SC-MCCH is received on a PRB different from the selected first PRB.

9. The method of claim 1, further comprising monitoring a narrow band physical downlink control channel (NPDCH) by using a group radio network temporary identifier (G-RNTI) to be mapped to a temporary mobile group identity (TMGI) on the selected first PRB, wherein the MBMS service is received through a single cell multicast traffic channel (SC-MTCH) identified through the monitoring of the NPDCCH.

10. The method of claim 9, further comprising, if the SC-MTCH identified through the monitoring of the NPDCCH is transmitted on a PRB different from the selected first PRB, receiving the MBMS service on the PRB different from the selected first PRB.

11. The method of claim 1, further comprising:
   monitoring a narrow band physical downlink control channel (NPDCH) by using a single cell notification radio network temporary identifier (SC-N-RNTI) on the selected first PRB; and
   receiving a single cell multicast control channel (SC-MCCH) change notification identified through the monitoring of the NPDCCH.

12. The method of claim 1, wherein the MBMS service is received through a single cell multimedia radio bearer (SC-MRB).

13. The method of claim 1, wherein the terminal is a narrow band-Internet of things (NB-IoT) terminal.

14. The method of claim 1, wherein the broadcast ID and the total number of PRBs within the system bandwidth are received by using system information.

15. A terminal for receiving a multimedia broadcast multicast service (MBMS) service in a wireless communication system, the terminal comprising:
   a memory;
   a transceiver; and
   a processor operatively coupled to the memory and the transceiver,
   wherein the processor is configured for:
      controlling the transceiver to receive from a base station a broadcast identifier (ID) and a total number of physical resource blocks (PRBs) within a system bandwidth;
      selecting a first PRB for the MBMS service within the system bandwidth based on the received broadcast ID and the total number of PRBs; and
      controlling the transceiver to receive the MBMS service on the selected first PRB.

16. The terminal of claim 15, wherein the broadcast ID is a temporary mobile group identity (TMGI).

17. The terminal of claim 16, wherein a PRB corresponding to a remainder value obtained by dividing the TMGI by the total number of PRBs is selected as the first PRB for the MBMS service within the system bandwidth.

18. The terminal of claim 15, wherein the broadcast ID is a group radio network temporary identifier (G-RNTI).

19. The terminal of claim 18, wherein a PRB corresponding to a remainder value obtained by dividing the G-RNTI by the total number of PRBs is selected as the first PRB for the MBMS service within the system bandwidth.

* * * * *